April 24, 1934.   O. S. PENN   1,956,472
ENDLESS CHAIN
Filed Jan. 12, 1933   2 Sheets-Sheet 2

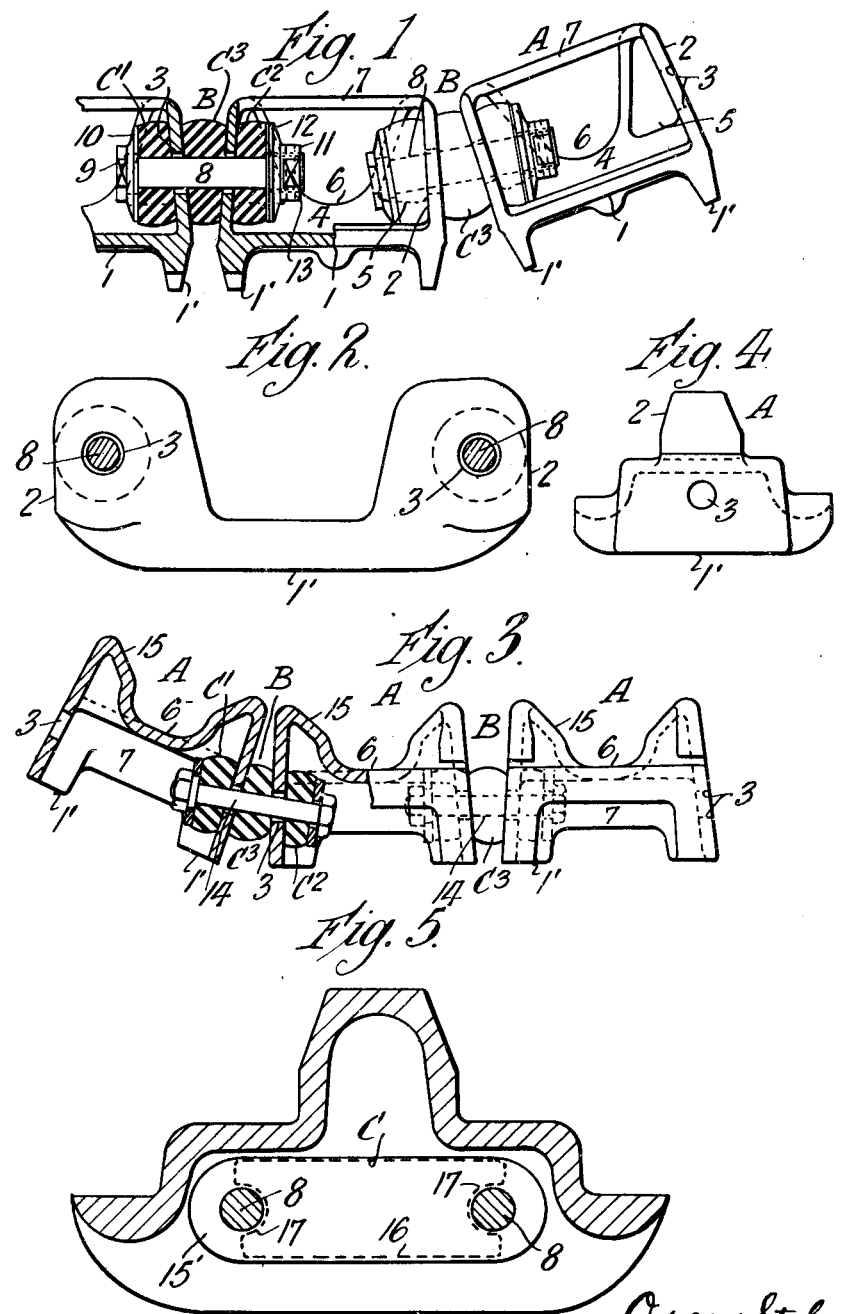

Oscar Styles Penn
By His Attorneys
Baldwin Wight

Patented Apr. 24, 1934

1,956,472

UNITED STATES PATENT OFFICE 1,956,472

ENDLESS CHAIN

Oscar Styles Penn, Normount, Upper Bourne End, England, assignor to Roadless Traction Limited, Middlesex, England, a company of Great Britain Application January 12, 1933, Serial No. 651,378
In Great Britain January 18, 1932

5 Claims. (Cl. 305—10)

This invention relates to improvements in endless tracks for vehicles of the kind wherein the working of the joints depends upon the flexure of rubber or like material and which constitutes the subject matter of my prior United States Patent 1,724,961 of August 20, 1929.

According to the present invention an endless track comprises a plurality of shoe members each shoe member having end walls spaced apart by a ground engaging plate; link members consisting of bolts passing through holes in the end walls of adjacent shoe members, and blocks of resilient material threaded on or carried by the bolts for holding said bolts out of contact with the end walls and another block for holding the end walls of adjacent shoe members out of contact with each other.

An essential feature of the present invention lies in the fitting of what are termed "reaction" blocks, these blocks holding the ends of adjacent link or shoe members, as the case may be, out of contact with each other. The reaction blocks play an important part in the operation of the joint, in that they assist to locate the hinge point as hereinafter explained.

The invention as applied to endless tracks is illustrated in the accompanying drawings in which Figure 1 is a part sectional elevation of three shoes and two links of an endless track in accordance with one embodiment of the invention. Figure 2 is an end view of one of the shoes.

Figures 3 and 4 are similar views of another embodiment of the invention.

Figure 5 is a transverse sectional view of a track shoe fitted with a modified construction of washer and rubber block.

Figure 6:
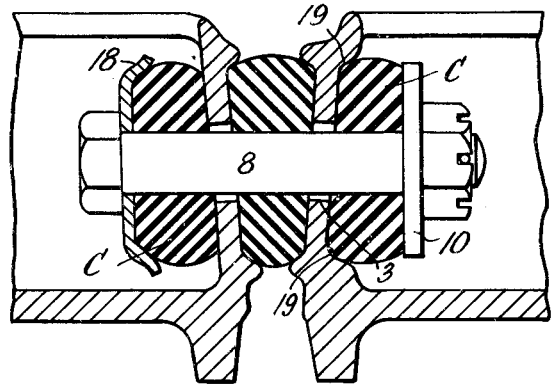
Figure 6 is a sectional view of a modified washer and shoe.

Referring to the accompanying drawings, the track is built up of shoe members indicated generally at A and link members indicated generally at B. $C^1$ to $C^3$ indicate blocks of rubber or other resilient material in a state of compression, which hold the parts of the track out of metallic contact with each other.

In Figures 1 and 2 each shoe member A comprises a ground or base plate 1 formed at its four corners with upstanding end walls or lugs 2 in which are holes 3 for the passage of the links B. The inner edges of each outer pair of end walls are connected to each other by webs 4 which for the purpose of lightness are cut away as indicated at 5. Each base plate 1 is provided at its ends with projections or spuds 1' so as to secure firm ground adhesion. The spuds 1' function, together with the base plate 1, as the ground plate.

The inner faces 6 of the webs 4 are shaped to receive the teeth of a sprocket wheel (not shown). Likewise each outer pair of walls is braced by a bridge piece 7.

The links B consist of steel members 8, arranged in pairs, and conveniently bolts may be provided. It will be appreciated however that any convenient number of links may be employed between adjacent shoe members depending upon the width of the track shoes and the leads to which the track will be subjected. The links B or bolts, as the case may be, have a clearance fit in the holes 3, through which they are passed. One end of each bolt is provided with a head 9 having a flange 10, while on the opposite end of the bolt is screwed a nut 11 having a flange 12. Each nut may be locked in position by a split pin passing through holes 13 in the head of the nut and bolt respectively. It will be noted that the links extend longitudinally between and across the ends of adjacent shoe members and therefore work under tension.

Threaded on the links B are rubber blocks $C^1$, $C^2$, which engage the flanges 10 and 12 on the inner faces of the lugs 2. Adjacent shoe members are held out of metallic contact with each other by means of blocks $C^3$ which function as the reaction blocks.

The rubber blocks may be of circular section as shown, but it is obvious that square, oval or other suitable shape may alternatively be employed. Moreover in place of the flanges 10 and 12 washers may be threaded on the bolts, the flange or washer being of substantially the same diameter or shape as the blocks. Reference to Figure 1 will show that, with the reaction block in position, the pivot point of the bolt 8 is always substantially coincident with a point central of the axis of the hole 3, i. e. about the point where the leading line to the reference 8 rests. If the reaction block were absent, the pivot point would shift to somewhere about the centre of the main block, i. e. about the point where the leading line to reference 14 rests in Figure 3. As a consequence of this it would be necessary to provide for a larger angular working movement of the bolt 8 where it passes through the hole 3, which can only be obtained by increasing the size of the hole. Any increase in the size of the hole would provide space, into which the rubber which is under compression, would immediately spew leading to its rapid destruction.

The rubber blocks may be of circular section as shown, but it is obvious that square, oval or other suitable shape may alternatively be employed. Moreover in place of the flanges 10 and 12 washers may be threaded on the bolts, the flange or washer being of substantially the same diameter and/or shape as the blocks. As shown on an enlarged scale in Figures 7 and 8 in practice the washers must be larger than the rubber blocks to prevent the latter from being cut by the edges of the washer as deflection takes place.

Referring now to Figures 3 and 4, there is shown a track assemblage in which a single bolt 14 is employed as the link member. In this assemblage also a modified construction of shoe member, which is of inverted transverse U-section, is employed.

In the arrangement of Figures 1 and 2, the blocks $C^1$ $C^2$ are entirely enclosed within the shoe member by the base or ground plate 1, while the reaction blocks $C^3$ are positioned within the area of the end walls and above the lower edges of the spuds 1' to insure against ground contact except under abnormal conditions, e. g., on very muddy or soft ground.

In the arrangement of Figures 3 and 4, the ground or base plate 1 is eliminated for the purpose of obtaining a lighter construction, and the blocks $C^1$ $C^2$ are housed in the center of the cup formed by the inverted U shape of the shoe member. In this case the bridge piece 7, which is cut away to form the spuds 1', constitutes the ground-engaging plate.

Lugs 15 are cast on the inner faces of each shoe plate so as to provide the necessary sprocket drive. When the shoes are of long pitch, the sprocket drive may alternatively be formed in the centre.

It will be found advantageous to arrange reaction blocks in such a manner that adjacent shoes have an initial angle of set in the direction of bending as shown at the right of Figure 1 and at the left of Figure 3. Assuming that the maximum normal angle of bend is 30°, the initial angle of set may be 10°, leaving only a further 20° of bending movement when the track passes around the driving sprockets and/or idler wheels.

Referring now to Figure 5 of the drawings, instead of two washers a single washer in the form of a plate 15' having holes for threading on the bolts 8 may be fitted. Likewise, the resilient blocks C may be constructed in one piece as indicated at 16, and in each end of which are provided holes for the bolts or as shown recesses 17.

The flanges or washers may if desired be cupped, as indicated at 18 at the left hand end of the bolt 8 in Figure 6. Likewise the surfaces of the shoes on which the blocks C contact may be formed with annular ribs or recesses 19 into which the blocks fit, the right hand shoe shown in Figure 6 being formed with such a recess.

Although in actual practice, the cupping assists to locate and retain the blocks in position, it should be understood that it is not provided expressly for this purpose but to provide a means of limiting the angular movement of the shoes relative to the links. The confining of the blocks has the effect of increasing the resistance to movement of the rubber and thus the resistance for any given angular movement of the shoes or links relative to each other may be adjusted as required It will be appreciated therefore that while the blocks shown in Figures 1-4 are threaded on the links it is not essential although it may be more convenient from the point of view of handling and assembling, the blocks being retained in position by the load upon them.

The present arrangement of resilient blocks wherein a ring of rubber is subjected to a substantially even endwise load has been found to operate extremely satisfactorily in practice since skin friction, owing to the even distribution of the load, is practically eliminated.

Figure 7:
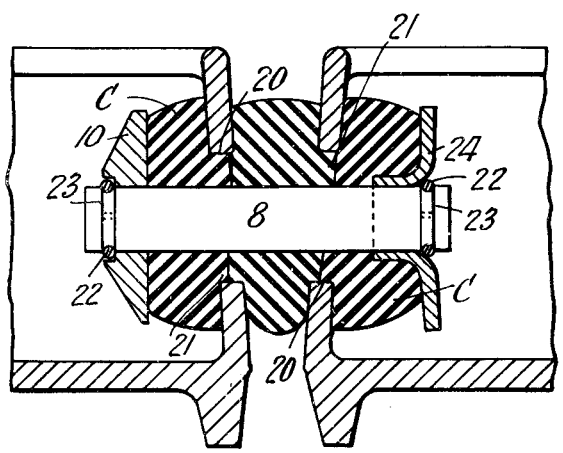
Figure 7 is a sectional view showing another alternative construction of shoe and washer.

Referring now to Figure 7, the holes 3 in the ends of the lugs may be enlarged as indicated at 20, and the end rubbers or the centre rubbers or both correspondingly formed with spigots 21 to fit within the enlarged holes.

The washers, one of which is shown at the right in Figure 7, consist of sheet metal members 24 formed with flanges which have a sliding fit on the bolts 8.

The washer members 24 are secured in position by means of spring rings 22 engaging in grooves 23 in the ends of the bolts 8.

Figure 8:
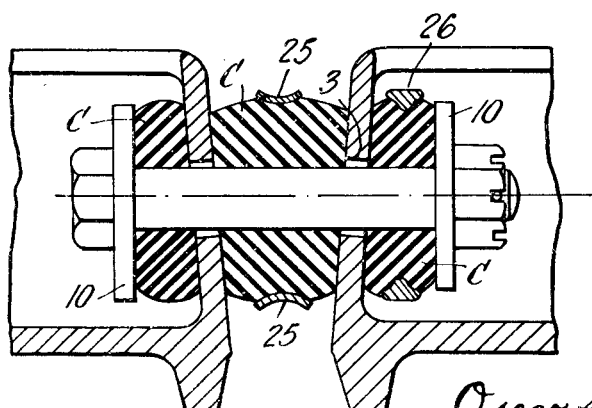
Figure 8 is a sectional detail view of another modification.

It may be desirable in certain cases to protect the rubber from injury, from dirt, etc. and as shown in Figure 8, a protecting ring 25 may be fitted. Another form of protection ring is shown at 26, which has the effect of limiting movement of the rubber.

What I claim is:—

1. In an endless track the combination of a plurality of shoe members having ground plates and upstanding end walls provided with aligned holes, bolts passing through the holes of adjacent end walls of contiguous shoe members, resilient reaction blocks on said bolts and between and contacting associated adjacent end wall outer faces, and resilient end blocks on the opposite ends of said bolts and contacting the associated inner end wall faces.

2. In an endless track the combination of a plurality of shoe members each having end walls separated by a ground plate which encloses completely the bottom of the shoe member, and which end walls are provided with aligned holes, bolts passing through the holes of adjacent end walls of contiguous shoe members, resilient reaction blocks on said bolts and between and contacting associated adjacent end wall outer faces, and resilient end blocks on the opposite ends of said bolts housed within the shoe members and located on the opposite ends of said bolts and contacting the associated inner end wall faces.

3. An endless track as claimed in claim 1 wherein the end walls are provided with enlarged holes and the end blocks formed with spigots to fit within the enlarged holes.

4. An endless track as claimed in claim 1 wherein protecting rings are fitted to certain of the blocks.

5. An endless track as claimed in claim 1 comprising shoe members, the end walls of which are provided on their outer faces with annular ribs forming recesses into which the reaction blocks fit.

OSCAR STYLES PENN.